Feb. 1, 1927.

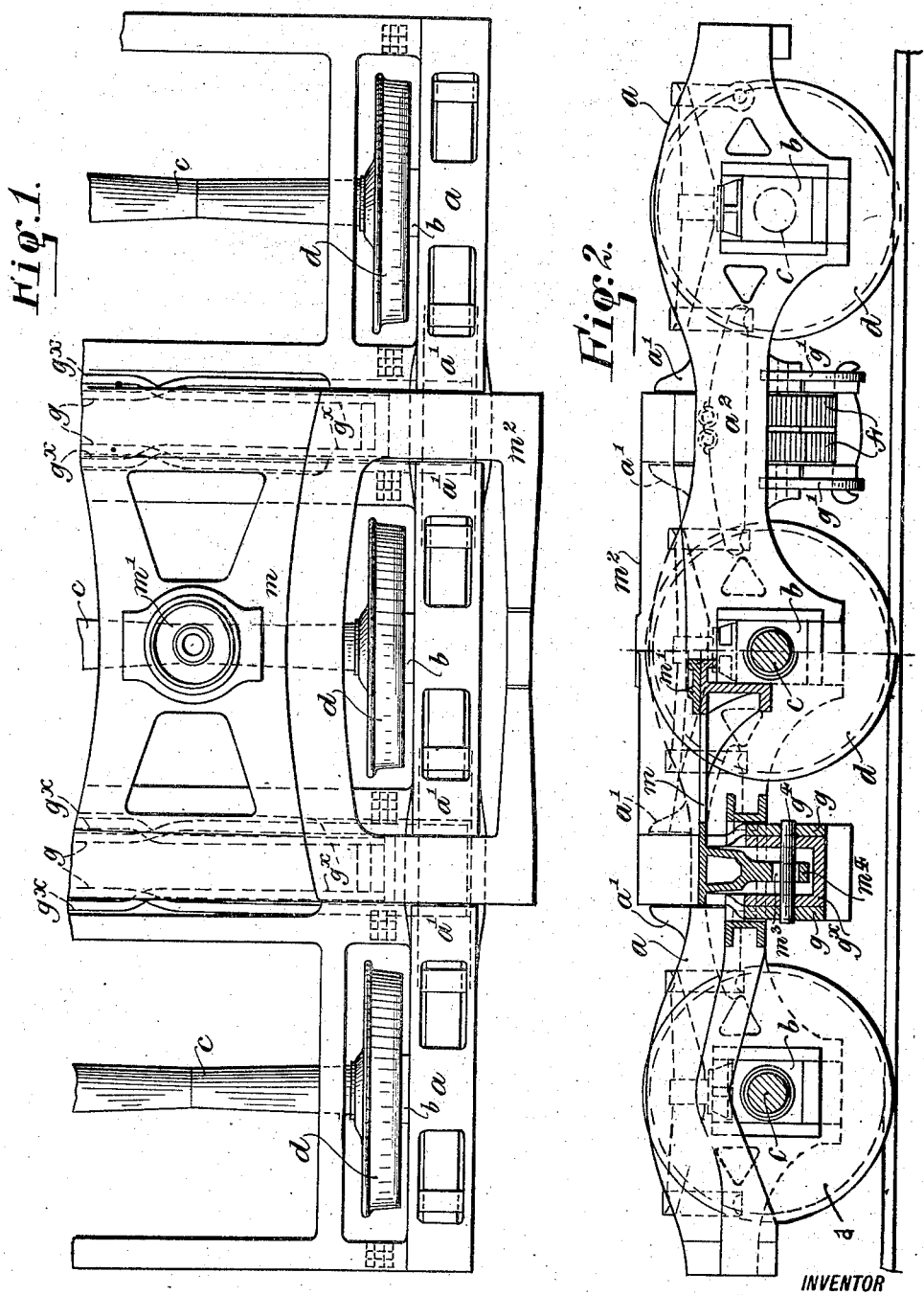

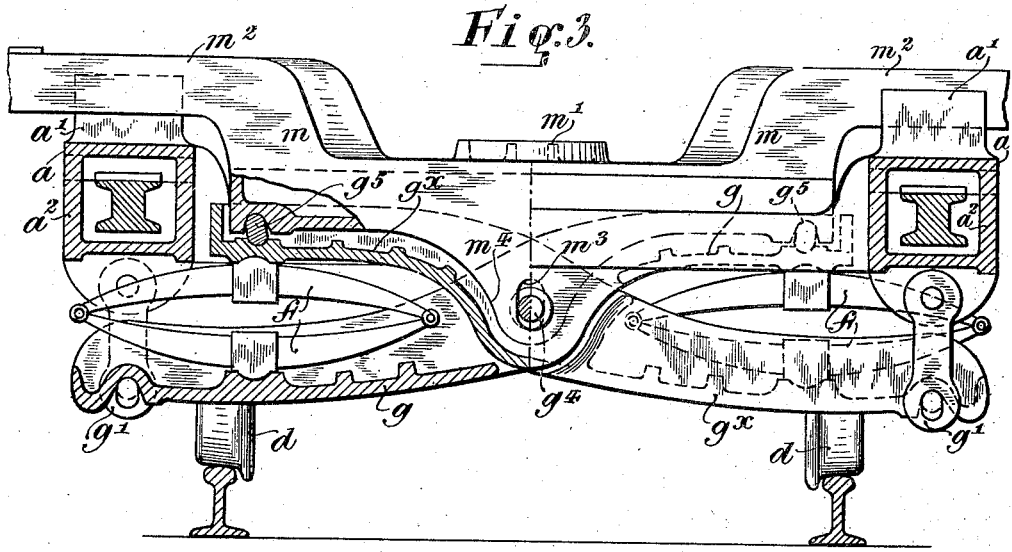
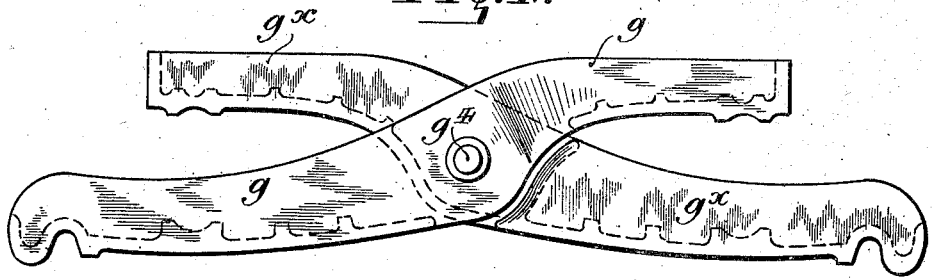
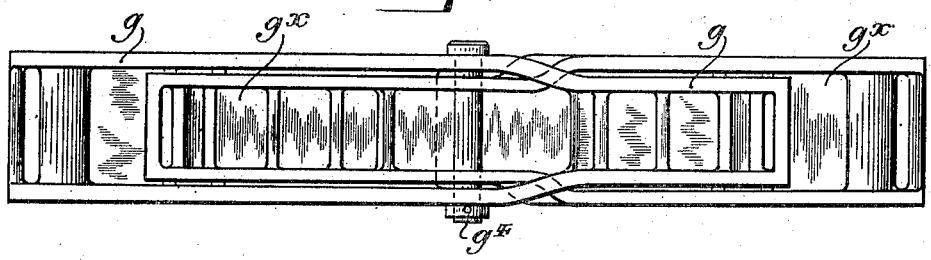

G. K. THOMPSON

CAR TRUCK

Filed Jan. 30, 1926  3 Sheets-Sheet 3

1,616,154

INVENTOR
George K. Thompson
BY
Redding Greeley
O'Shea & Campbell
ATTORNEYS

Patented Feb. 1, 1927.

1,616,154

UNITED STATES PATENT OFFICE.

GEORGE K. THOMPSON, OF SUMMIT, NEW JERSEY.

CAR TRUCK.

Application filed January 30, 1926. Serial No. 84,884.

This invention relates to car trucks of the general character of those shown in Letters Patent of the United States No. 1,211,789, January 9, 1917, and No. 1,392,721, October 4, 1921, and more especially to car trucks of the construction shown in Letters Patent of the United States No. 1,575,136, March 2, 1926. The broad invention covered in that application and embodying bolster levers pivotally connected at a middle point, supporting the car body at their middle portion and each fulcrumed at one side of the truck and spring supported at the other side, is illustrated in that application as applied to a four-wheeled or freight truck. In the application of the same broad invention to a six-wheeled truck or passenger truck some modifications in details of construction and arrangement are desirable and the present application is intended to disclose and to cover the features of construction, both with respect to the bolster levers themselves and to their associated parts, which are desirable in the application of the broad invention to a six-wheeled truck, although, as will be seen, some of the features of construction herein shown and described might be incorporated also in a four-wheeled truck. The general purposes of the present invention are substantially the same as set forth in said former application, namely, to provide improved means for distributing the pressure of the load, for preserving the parallelism of the car body with the truck axles under various conditions of load and of road bed, for reducing the extent of movement of the car body with respect to the truck under the influence of inequalities of track and for cushioning the car body, as well as for reducing the side sway of the car body.

The invention will be explained more fully hereinafter with reference to the accompanying drawings in which it is illustrated in connection with a car truck of approved construction and in which:—

Figure 1 is a partial top view of a car truck equipped with the present improvements.

Figure 2 is a view of the same partly in longitudinal vertical section and partly in side elevation.

Figure 3 is a view in transverse sectional elevation, partly broken away to save space.

Figures 4 and 5 are detail views in elevation and in plan of the bolster levers removed from the truck.

Figure 6:
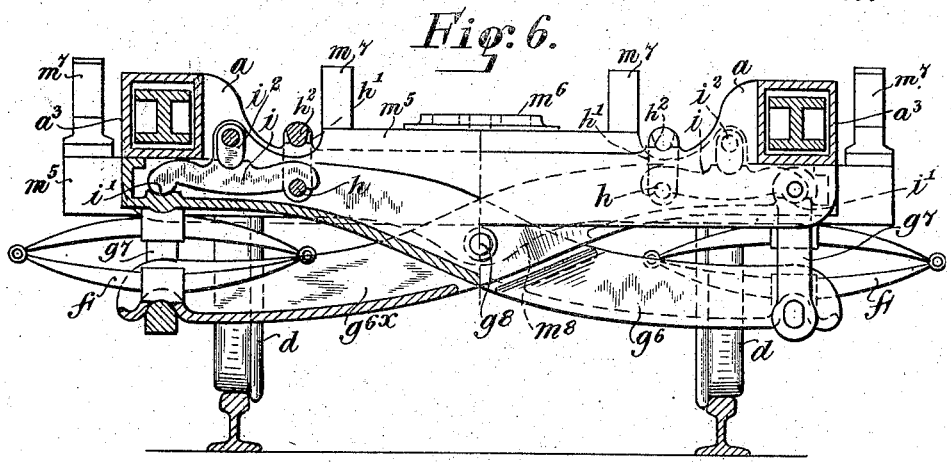
Figure 6 is a view similar to Figure 3 but showing a slightly different embodiment of the invention.

The truck frame, of which a part is indicated at $a$, may be of any usual or suitable construction except so far as it may be necessary to modify the same in some details to accommodate the application thereto of the present invention. It is provided with suitable journal boxes $b$ to receive the axles $c$ which carry the wheels $d$. In the present construction there is preferably interposed between the bolster levers hereinafter mentioned and the car body or car bolster, not shown, a truck bolster $m$ which may be provided with a central bearing $m'$ and two side bearings $m^2$, on which the car body is supported, the truck bolster $m$ having capacity for relative vertical movement with respect to the truck frame and being positioned by lugs or brackets $a'$ on the side members of the truck frame.

The coacting, load distributing levers $g$ and $g^x$, of which in a six-wheel truck, there are two pairs, for the broad truck bolster, are fulcrumed at one end on links $g'$, hung from the side members $a^2$ of the truck frame, and are preferably of open plate construction, such that each straddles the other at one end and that they cross each other at the middle where they are pivotally connected, as by a rod or bolt $g^4$, which is positioned, with freedom for vertical movement, in a vertical slot $m^3$ formed in a depending portion $m^4$ of the bolster $m$. Between the ends of the two bolster levers, $g^x$, are interposed the springs $f$ so that the shorter and upper arm of each lever is spring supported upon the lower and longer arm of the other lever and therefore, through the link $g'$, is spring supported on the truck frame. As the bolster levers are hung by links from the truck frame and as the springs are carried by the bolster levers, provision is made for accommodation of side sway of the truck bolster which is supported on the levers and of the body with respect to the truck frame, without distortion of the spring. The body is supported on the bolster levers through the intermediary of the truck bolster which rests upon the shorter and upper arms of the bolster levers, preferably through rocker bars $g^5$, which accommodate the slight relative movement of the bolster and the bolster levers.

It will be understood that the car load, applied through the truck bolster $m$, acts upon both levers $g$ and $g^x$, through the points of support at $g^5$, and is distributed equally to the two sides of the truck through the interposed springs $f$, the lower members of the bolster levers and the links $g'$ on which the lower members of the levers are fulcrumed. Through the pivotal connection of the two levers of each pair pressure on the upper and shorter arms of the one lever will produce a like effect at the corresponding end of the other lever and both sides of the bolster, which is free to move with respect to the pivotal connection of the two levers, will move alike, so that parallelism of the car body with the truck will be preserved and there will be no tendency to create side sway. Through the relation of the lever arms, as will be noted, any vertical movement at the lower ends of the levers, occasioned by inequalities of the track, will be substantially reduced at the upper ends of the shorter arms and the relative movement of the car body with respect to the truck will be reduced accordingly.

Figure 7:
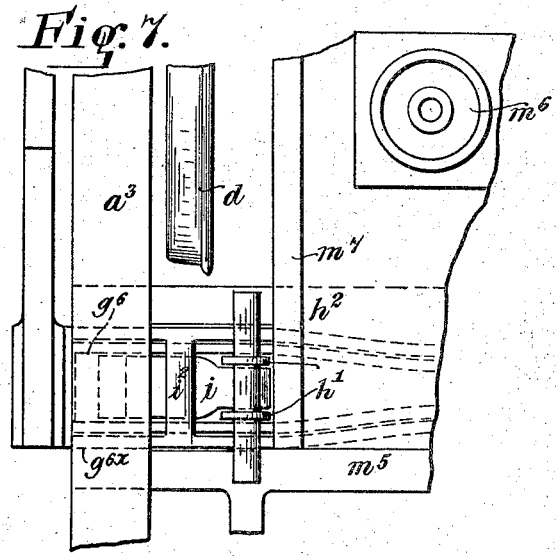
Figure 7 is a partial top view and Figure 8 is a partial end elevation of the construction shown in Figure 6.
Figure 8:
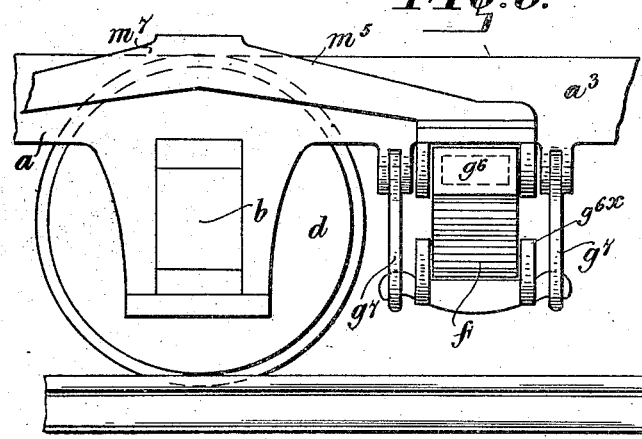

The construction shown in Figures 6, 7 and 8 of the drawings is substantially the same as that already described, but embodies secondary levers, such as those described in the Patent No. 1,575,136 above mentioned, whereby the movement of the car body with respect to the truck is still further reduced. The truck frame $a$, the journal boxes $b$, the axles (not shown) and the wheels $d$ are constructed and arranged substantially as already described. There is also interposed between the bolster levers and the car body or car bolster, a truck bolster $m^5$ which may be provided with a central bearing $m^6$ and with suitable body supports $m^7$ and is adapted for cooperation with two sets of load distributing levers or bolster levers $g^6$ and $g^{6x}$ which are fulcrumed at one end on links $g^7$, hung from the side members $a^3$ of the truck frame, and generally formed substantially as already described with respect to Figures 3 and 4. In this instance, there being no necessity for vertical movement of the pivotal connection of the two bolster levers, the bolt or rod $g^8$ by which they are pivotally connected, is supported in a depending portion $m^8$ of the bolster $m^5$ without provision for movement in a vertical plane. The springs $f$, as before, are interposed between the ends of the two bolster levers $g^6$ and $g^{6x}$ so that the shorter and upper arm of each lever is spring supported upon the lower and longer arm of the other lever and therefore, through the links $g^7$, is spring supported on the truck frame. In this modified construction, to provide for still further reduction of the relative movement of the car body, the bolster $m^5$ is supported on the bolster levers $g^6$ and $g^{6x}$, through the intermediary of the secondary levers $i$, each of which, at one end, bears on a bottom rod $h$ supported by a double hanger $h'$ and a cross rod $h^2$ from the truck frame. At its other end each secondary lever bears at $i'$ on the corresponding bolster lever $g^6$ or $g^{6x}$, near its end. The bolster $m^5$ is carried on the secondary levers $i$ through the intermediary of rockers $i^2$ which are carried by the bolster and rest on the lever it will be seen that in the construction shown, the relative movement of the bolster $m^5$ with respect to the ends of the bolster levers $g^6$ and $g^{6x}$, is reduced by the interposition of the secondary levers, by about one-half and is therefore quite small as compared with the movement of the truck frame itself, the relative movement of the upper ends of the levers $g^6$ and $g^{6x}$, as already explained, being much reduced as compared with the movement of the truck frame.

It will be understood that various other changes in details of construction and arrangement can be made to suit different conditions of use and the convenience of the manufacturer and that, except as pointed out in the claims, the invention is not restricted to the precise construction shown and described herein.

I claim as my invention:

1. In combination with a car truck, bolster levers pivotally connected at a middle point and adapted to support the load at their upper extremities only, each lever being supported directly by the truck frame at the other extremity only.

2. In combination with a car truck, bolster levers pivotally connected at a middle point and adapted to support the load at their upper extremities only, each lever being supported directly by the truck frame at the other extremity only, and a truck bolster adapted to support the car body and itself supported upon the bolster levers at their upper extremities.

3. In combination with a car truck, bolster levers pivotally connected at a middle point and adapted to support the load at their upper extremities, each lever being supported by the truck frame at the other extremity, and a truck bolster adapted to support the car body and itself supported upon the bolster levers at their upper extremities, the bolster being formed to position and accommodate the relative movement of the pivotal connection of the levers.

4. In combination with a car truck, bolster levers pivotally connected at a middle point and adapted to support the load at their upper extremities, links by which the levers are supported from the truck frame at their other extremities, and springs interposed between the members of the levers at each end.

5. In combination with a car truck, bolster levers pivotally connected at a middle point and adapted to support the load at their upper extremities, links by which the levers are supported from the truck frame at their other extremities, springs interposed between the members of the levers at each end, and a bolster supported on the levers at their upper extremities.

6. In combination with a car truck, bolster levers pivotally connected at a middle point, each lever being supported directly by the truck frame at one extremity only, and secondary levers hung from the truck frame bearing directly upon the bolster levers and adapted to support the load.

7. In combination with a car truck, bolster levers pivotally connected at a middle point, each lever being supported directly by the truck frame at one extremity only, secondary levers hung upon the truck frame and bearing directly on the bolster levers at their other extremities, and a truck bolster supported on said secondary levers.

This specification signed this 29 day of January A. D. 1926.

GEORGE K. THOMPSON.